US010530892B2

(12) United States Patent
Yin et al.

(10) Patent No.: US 10,530,892 B2
(45) Date of Patent: Jan. 7, 2020

(54) PROCESSING REQUEST FOR MULTI-VERSIONED SERVICE

(71) Applicant: Microsoft Technology Licensing, LLC, Redmond, WA (US)

(72) Inventors: Zhicheng Yin, Bellevue, WA (US); Xiaoyu Chen, Beijing (CN); Tao Guan, Redmond, WA (US); Paul Michael Brett, Kirkland, WA (US); Nan Zhang, Sammamish, WA (US); Jaliya N. Ekanayake, Redmond, WA (US); Eric Boutin, Renton, WA (US); Anna Korsun, Bellevue, WA (US); Jingren Zhou, Bellevue, WA (US); Haibo Lin, Issaquah, WA (US); Pavel N. Iakovenko, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 588 days.

(21) Appl. No.: 15/197,583

(22) Filed: Jun. 29, 2016

(65) Prior Publication Data

US 2017/0094020 A1 Mar. 30, 2017

Related U.S. Application Data

(60) Provisional application No. 62/233,992, filed on Sep. 28, 2015.

(51) Int. Cl.
*G06F 15/173* (2006.01)
*H04L 29/08* (2006.01)
(Continued)

(52) U.S. Cl.
CPC ........ *H04L 67/327* (2013.01); *G06F 9/44521* (2013.01); *G06F 9/5083* (2013.01);
(Continued)

(58) Field of Classification Search
CPC ..... G06F 17/30312; G06F 9/46; G06F 9/5066
See application file for complete search history.

(56) References Cited

U.S. PATENT DOCUMENTS 6,460,059 B1 10/2002 Wisniewski
6,785,706 B1 8/2004 Horman
(Continued)

OTHER PUBLICATIONS

"Non Final Office Action Issued in U.S. Appl. No. 15/197,592", dated Mar. 8, 2018, 17 Pages.
(Continued)

*Primary Examiner* — Umar Cheema
*Assistant Examiner* — Tesfu N Mekonen
(74) *Attorney, Agent, or Firm* — Workman Nydegger

(57) ABSTRACT

Processing received job requests for a multi-versioned distributed computerized service. For each received job request, the job request is channeled to an appropriate service processing node that depends on the version of the distributed computing service that is to handle the job request. A version of the distributed computing service is assigned to the incoming job request. A service processing node that runs a runtime library for the assigned service version is then identified. The identified service processing node also has an appropriate set of one or more executables that allows the service processing node to plan an appropriate role (e.g., compiler, scheduler, worker) in the distributed computing service. The job request is then dispatched to the identified service processing node.

20 Claims, 6 Drawing Sheets

(51) Int. Cl.
*G06F 9/445* (2018.01)
*G06F 9/50* (2006.01)

(52) U.S. Cl.
CPC .............. *H04L 67/02* (2013.01); *H04L 67/10* (2013.01); *H04L 67/1097* (2013.01); *H04L 67/16* (2013.01)

(56) References Cited

U.S. PATENT DOCUMENTS

| | | |
|---|---|---|
| 7,140,012 B2 | 11/2006 | Pugh et al. |
| 7,178,143 B2 | 2/2007 | Pugh et al. |
| 7,647,636 B2 | 1/2010 | Polyakov et al. |
| 7,698,419 B2 | 4/2010 | Flores et al. |
| 8,387,032 B1 | 2/2013 | Goldman et al. |
| 8,903,711 B2 | 12/2014 | Lundberg et al. |
| 9,122,535 B2* | 9/2015 | Soundararajan ...... G06F 9/5066 |
| 9,183,058 B2* | 11/2015 | Li ........................ G06F 9/5066 |
| 9,207,956 B2* | 12/2015 | Schuler .................... G06F 8/41 |
| 9,262,217 B1* | 2/2016 | Xiang ................... G06F 9/5011 |
| 9,477,502 B2* | 10/2016 | Chambers ............. G06F 9/3885 |
| 9,773,014 B2* | 9/2017 | Lee ................... G06F 17/30194 |
| 9,891,939 B2 | 2/2018 | Hunt et al. |
| 2002/0133805 A1 | 9/2002 | Pugh et al. |
| 2010/0115504 A1 | 5/2010 | Cai et al. |
| 2012/0159506 A1* | 6/2012 | Barham ................ G06F 9/5044 718/104 |
| 2012/0191714 A1* | 7/2012 | Datar ................ G06F 17/30867 707/737 |
| 2012/0227039 A1 | 9/2012 | Ferdman et al. |
| 2013/0227558 A1* | 8/2013 | Du ...................... G06F 9/45558 718/1 |
| 2014/0059310 A1* | 2/2014 | Du ......................... G06F 3/065 711/162 |
| 2014/0059552 A1* | 2/2014 | Cunningham ........... G09G 5/00 718/102 |
| 2015/0058843 A1 | 2/2015 | Holler et al. |
| 2015/0121371 A1* | 4/2015 | Gummaraju ...... G06F 17/30194 718/1 |
| 2015/0339210 A1* | 11/2015 | Kopp .................. G06F 11/3495 718/100 |
| 2016/0179581 A1* | 6/2016 | Soundararajan ...... G06F 9/5033 718/104 |
| 2017/0046420 A1* | 2/2017 | Fuchs ....................... G06F 9/46 |
| 2017/0090958 A1 | 3/2017 | Yin et al. |

OTHER PUBLICATIONS

"Hortonworks Data Platform", Published on: Jul. 21, 2015 Available at: http://docs.hortonworks.com/HDPDocuments/HDP2/HDP-2.3.0/bk_yarn_resource_mgt/bk_yarn_resource_mgt-20150721.pdf.

White, Tom, "Hadoop: The Definitive Guide 4th Edition", In Publication of O'Reilly Media, Apr. 2015, 756 pages.

Livshits, et al., "CONSCRIPT: Specifying and Enforcing Fine-Grained Security Policies for JavaScript in the Browser", In Microsoft Research Technical Report of MSR-TR-2009-158, Dec. 3, 2009, pp. 1-24.

"Apache Slider: Dynamic YARN Application", Published on: Nov. 30, 2014 Available at: https://slider.incubator.apache.org/.

"Hadoop MapReduce Next Generation—Distributed Cache Deploy", Published on: Feb. 24, 2015 Available at: https://hadoop.apache.org/docs/r2.5.2/hadoop-mapreduce-client/hadoop-mapreduce-client-core/DistributedCacheDeploy.html.

Kakade, et al., "Spam Filtering Techniques and MapReduce with SVM: A Study", In Proceedings of Asia-Pacific Conference on Computer Aided System Engineering, Feb. 12, 2014, pp. 59-64.

Ulusoy, et al., "Honeypot Based Unauthorized Data Access Detection in MapReduce Systems", In Proceedings of IEEE International Conference on Intelligence and Security Informatics, May 27, 2015, pp. 126-131.

Musa, et al., "A Converged Service Plane for Virtual Infrastructure Containers", In International Journal of Computer Science Issues, vol. 10, Issue 2 No. 2, Mar. 2013, pp. 375-386.

Xu, et al., "Deploying and Researching Hadoop in Virtual Machines", In Proceeding of the IEEE International Conference on Automation and Logistics, Aug. 2012, pp. 395-399.

* cited by examiner

PROCESSING REQUEST FOR MULTI-VERSIONED SERVICE

CROSS-REFERENCE TO RELATED APPLICATIONS

This application claims the benefit of U.S. Provisional Patent Application Ser. No. 62/233,992, filed Sep. 28, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing large amounts of data (often referred to simply as "big data") that itself might be distributed across multiple network nodes, it is often most efficient to divide data processing amongst the various network nodes. These divisions of logical work are often referred to as "vertices" in the plural, or a "vertex" in the singular. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a computerized mechanism for processing received job requests for a multi-versioned distributed computerized service. For instance, the distributed computerized service might be a map-reduced based service. However, each version of the distributed computerized service has an associated runtime library that are made available to components that offer the service. An example of the distributed computerized service is a queriable data store, such as a big data store.

For instance, a processing node of a cloud computing environment might have one or more executables that perform job compilation for one version of the distributed computerized service by compiling job requests into execution plans. Another processing node of the cloud computing environment might have one or more other executables that perform job scheduling for the associated version of the distributed computerized service by using the execution plan to schedule vertices of the job. Other processing nodes of the cloud computing environment might have yet one or more other executable that are workers that actually execute the scheduled vertices as directed by the scheduler. No matter what role the processing node plays (compiler, scheduler, or worker), the processing node utilizes a runtime library that corresponds to the version of the distributed computerized service. A computing system that performs a role in a distributed computerized service will be referred to as a "processing node" or "service processing node" herein.

For each received job request, the job request is channeled to an appropriate service processing node that depends on the version of the distributed computing service that is to handle the job request. A version of the distributed computing service is assigned to the incoming job request (e.g., based on inspection of the structure of the job request, based on the identity of the requestor, and/or based on version assignment policy). A service processing node that runs a runtime library for the assigned service version is then identified. The identified service processing node also has an appropriate set of one or more executables that allows the service processing node to plan an appropriate role (e.g., compiler, scheduler, worker) in the distributed computing service. The job request is then dispatched to the identified service processing node.

This configuration allows for job requests to be appropriately dispatched to a proper version of a distributed computerized service. In some embodiments, each of the service processing nodes may quickly access the runtime library for each version of the distributed computerized service via a centralized store in which the runtime libraries are already represented in allocated form. For instance, the runtime library binary may simply be loaded from the centralized store into the memory of the service processing node to allow the service processing node to serve a particular version of the distributed computerized service. Thus, a service processing node may quickly change from one version of the distributed computerized service to another. Such switching may be performed so quickly that the service processing node may even be seen as running multiple versions of the distributed computerized service simultaneously, especially when viewed in the context of a long running service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
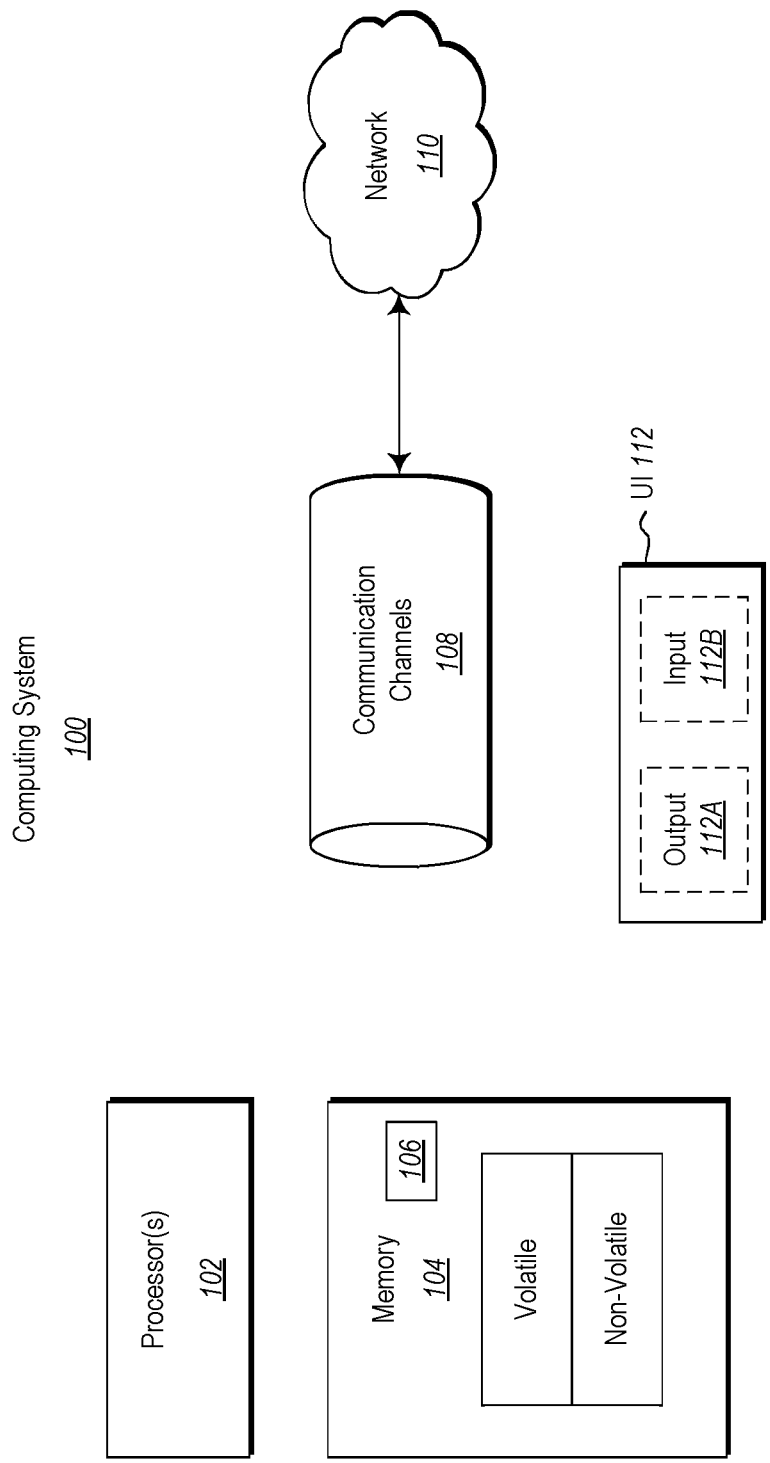
FIG. 1 illustrates an example computing system in which the principles described herein may be employed.

At least some embodiments described herein relate to a computerized mechanism for processing received job requests for a multi-versioned distributed computerized service. For instance, the distributed computerized service might be a map-reduced based service. However, each version of the distributed computerized service has an associated runtime library that are made available to components that offer the service. An example of the distributed computerized service is a queriable data store, such as a big data store.

For instance, a processing node of a cloud computing environment might have one or more executables that perform job compilation for one version of the distributed computerized service by compiling job requests into execution plans. Another processing node of the cloud computing environment might have other one or more executables that perform job scheduling for the associated version of the distributed computerized service by using the execution plan to schedule vertices of the job. Other processing nodes of the cloud computing environment might have yet one or more other executable that are workers that actually execute the scheduled vertices as directed by the scheduler. No matter what role the processing node plays (compiler, scheduler, or worker), the processing node utilizes a runtime library that corresponds to the version of the distributed computerized service. A computing system that performs a role in a distributed computerized service will be referred to as a "processing node" or "service processing node" herein.

For each received job request, the job request is channeled to an appropriate service processing node that depends on the version of the distributed computing service that is to handle the job request. A version of the distributed computing service is assigned to the incoming job request (e.g., based on inspection of the structure of the job request, based on the identity of the requestor, and/or based on version assignment policy). A service processing node that runs a runtime library for the assigned service version is then identified. The identified service processing node also has an appropriate set of one or more executables that allows the service processing node to plan an appropriate role (e.g., compiler, scheduler, worker) in the distributed computing service. The job request is then dispatched to the identified service processing node.

This configuration allows for job requests to be appropriately dispatched to a proper version of a distributed computerized service. In some embodiments, each of the service processing nodes may quickly access the runtime library for each version of the distributed computerized service via a centralized store in which the runtime libraries are already represented in allocated form. For instance, the runtime library binary may simply be loaded from the centralized store into the memory of the service processing node to allow the service processing node to serve a particular version of the distributed computerized service. Thus, a service processing node may quickly change from one version of the distributed computerized service to another. Such switching may be performed so quickly that the service processing node may even be seen as running multiple versions of the distributed computerized service simultaneously, especially when viewed in the context of a long running service.

Some introductory discussion of a computing system will be described with respect to FIG. 1. Then, the mechanism and methods that enable the job request to be channeled to an appropriate service processing node that depends on the version of the distributed computing service that is to handle the job request will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality objects, and so forth. Examples of input mechanisms 112B might include, for instance, microphones, touchscreens, holograms, cameras, keyboards, accelerometers, levers, pedals, buttons, knobs, mouse of other pointer input, sensors of any type, virtual reality objects, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
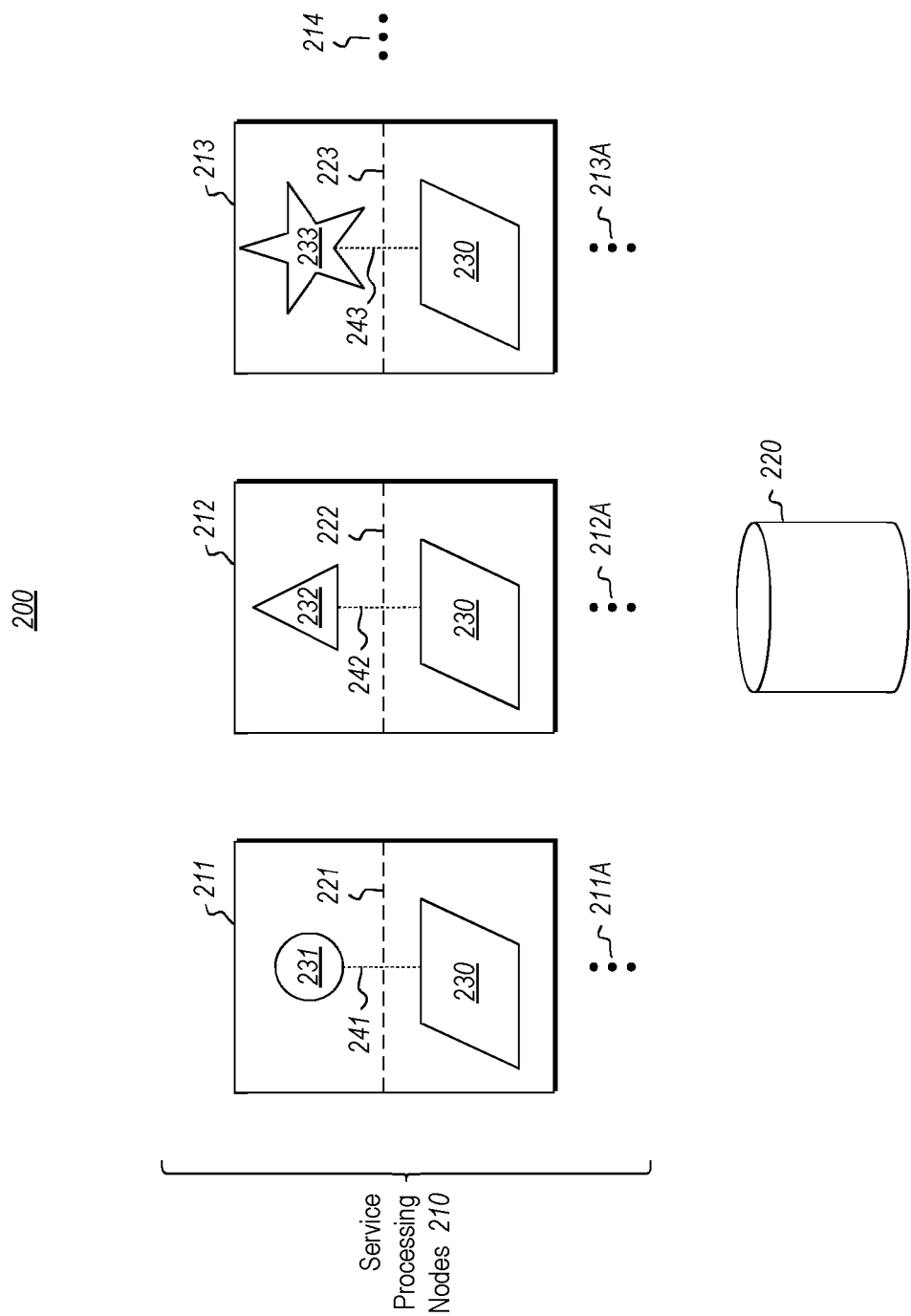
FIG. 2 symbolically illustrates a service environment of a distributed computerized service having a single version each which each of multiple service processing nodes plays a role in the overall distributed computerized service.

FIG. 2 symbolically illustrates a service environment 200 of a distributed computerized service having a single version. The service environment 200 includes multiple service processing nodes 210 including a first service processing node 211 that plays a role (hereinafter also referred to as a "first role") in the distributed computerized service, a second service processing node 212 that plays another role (hereinafter also referred to as a "second role") in the distributed computerized service, and a third service processing node 213 that plays yet another role (hereinafter also referred to as a "third role") in the distributed computerized service.

The ellipses 214 represent that there may be yet other groups of service processing nodes that perform one or more further roles in the distributed computerized service. The ellipses 211A, 212A and 213A represent that there may be more than one service processing node that plays the part of the first role, second role, and third role, respectively, in the distributed computerized service. In one embodiment, the distributed computerized service involves the processing of a job request. In that case, each of the roles played may be viewed as at least partially processing the job request. An example of a distributed computerized service is a web service, or any offering that involves computerized processing that is available over a network. For instance, a distributed computerized service might include a big data query service, or a database query service.

Each service processing node 210 may be, for instance, a computing system in a dedicated environment of interconnected computing systems, in which the environment serves as a pool of resources to respond to incoming job requests. As an example, if the dedicated environment were a cloud computing environment (such as a public, private, or hybrid cloud), each of the service processing nodes might be a processing node in that cloud computing environment. In any case, the service processing nodes 210 may each be structured as described above for the computing system 100 of FIG. 1. Furthermore, the service processing nodes 210 may each have access to a centralized store 220.

Each of the service processing nodes associated with a given version of the distributed computerized service has a common runtime library. In FIG. 2, this runtime library is represented by the shape below the respective dashed line 221, 222 and 223. For instance, each of the service processing nodes 211, 212 and 213 has a common runtime library 230. The commonality of the runtime library for all service processing nodes that contribute to the distributed computerized service of the given version is represented by the common runtime library 230 having a same shape (e.g., a rightward leaning parallelogram) in each of the service processing nodes 211, 212 and 213 as illustrated just below the respective dashed lines 221, 222 and 223.

Notwithstanding that each of the service processing nodes 210 performs part of the same version of the distributed computerized service, each of the service processing nodes 211, 212 and 213 performs a different role within the distributed computerized service. The role that the service processing nodes 210 performs is defined by the identity of the set of one or more executables that interact with the runtime library of the version of the distributed processing node. The role that a set of executables plays within the distributed computerized service is represented by the shape above the dashed lines 221, 222 and 223 in each of the service processing nodes 211, 212 and 213. An executable may be any set of one or more instruction that may be directly or indirectly executed to affect the functioning of the service processing node. Examples include functions, routines, objects, procedures, methods, directives, and the like.

For instance, the service processing node 211 is illustrated as having a set 231 of one or more executables that cause the service processing node 211 of one type (as represented by a circle) that interact (as represented by dotted line 241) with the runtime library 230 in a manner to provide a first role within the distributed computerized service. The service processing node 212 is illustrated as having another set 232 of one or more executables of a second type (as represented by a triangle) that interact (as represented by dotted line 242) with the runtime library 230 in a manner to provide a second role within the distributed computerized service. Likewise, the service processing node 213 is illustrated as having another set 233 of one or more executables of a third type (as represented by a five-pointed star) that interact (as represented by dotted line 243) with the runtime library 230 in a manner to provide a third role within the distributed computerized service.

As an example, the first role might be a compilation role that is configured to compile job requests that are to be processed into a corresponding execution plan for the distributed computerized service. Thus, the service processing node 211 might receive a job request and provide a corresponding execution plan. As another example, the second role might be a scheduling role that is configured to schedule one or more vertices of an execution plan for processing by one or more other service processing nodes. A stage of an execution plan may comprise one vertex (e.g., code) of the compiled job, or may be a parallel combination of vertices of the compiled job. For instance, if the execution plan is a map-reduce plan, then the parallel vertices of a stage might be divided by key in accordance with a map-reduce framework. Thus, the service processing node 212 might receive an execution plan and dispatch vertices according to a schedule onto one or more worker processing nodes. As another example, the third role might a worker role that executes a vertex of an execution plan. Thus, the service processing node 213 might receive a vertex execution assignment from the scheduler (e.g., service processing node 212), execute the vertex accordingly, and report back to the scheduler upon completion.

Figure 3:
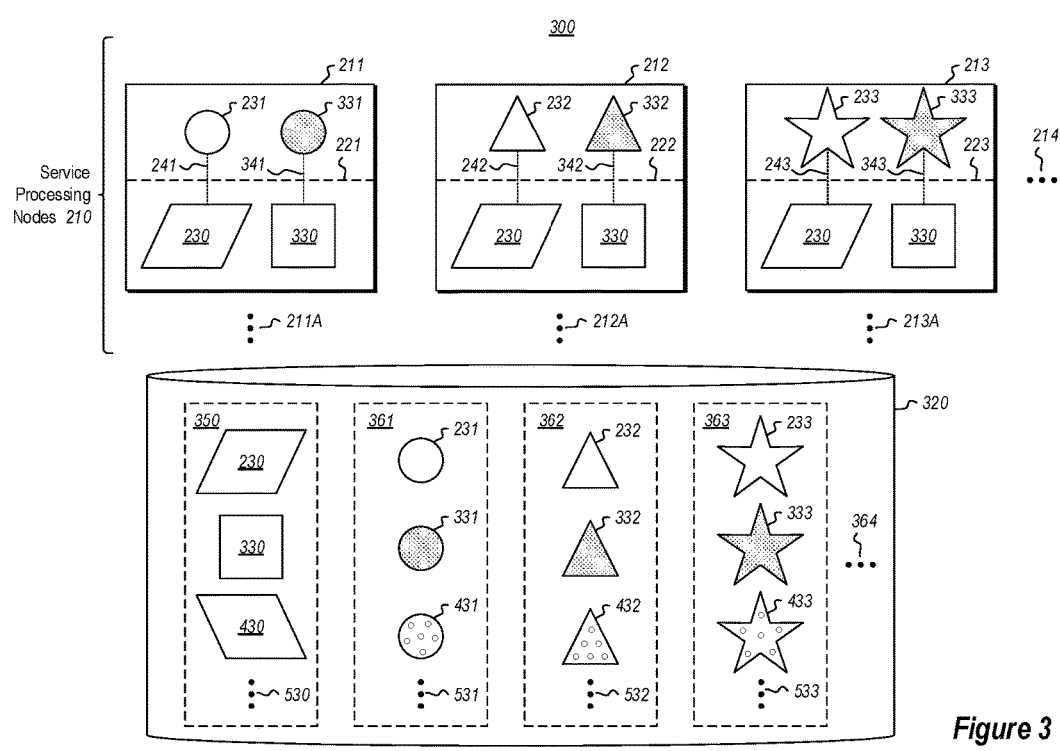
FIG. 3 is an environment that is similar to that of FIG. 2, except that each service processing node now plays roles in multiple versions of the distributed computerized service.

FIG. 3 illustrates a service environment 300 that is like the service environment 200 of FIG. 2, except that each of the service processing nodes 210 runs a second runtime library 330, in addition to the first runtime library 230. The service processing nodes 210 again have access to a centralized store 320. The centralized store 320 includes multiple runtime libraries 350, each corresponding to a different version of the distributed computerized service. For instance, a different version might be a test version of a more commonly used version, or perhaps a new upgraded version of an older version.

For instance, the runtime libraries 350 are illustrated as including the runtime library 230 that supports to the first version of the distributed computerized service. The runtime libraries 350 also includes a second runtime library 330 that is used to implement a second version of the distributed computerized service. That is, all service processing nodes that contribute to roles within the second version of the distributed computerized service have the second runtime library 330. The common functionality provided by the second runtime library 330 for the second version of the distributed computerized service is represented by each of the runtime library 330 having a same shape—a rectangle. The runtime library 350 also has a third runtime library 430 that is used to implement a third version of the distributed computerized service. That is, all service processing nodes that contribute to roles within the third version of the distributed computerized service have the third runtime library 430. The common functionality provided by the third runtime library 430 for the third version of the distributed computerized service is represented by each of the runtime library 430 having a same shape—a left leaning parallelogram.

The ellipses 530 represent that the runtime libraries 350 may include runtime libraries for any number of versions of the distributed computerized service. In some embodiments, the runtime libraries are already in allocated form, such that the binary of the runtime library need only be loaded into the system memory of a service processing node in order for the service processing node to be ready to play a role the distributed computerized service.

In the service environment 300 as depicted, each of the service processing nodes 210 serves the same role for each of the two versions of the distributed computerized service. For instance, the service processing node 211 may have a set of executable(s) 331 that interact (as represented by the dotted line 341) with the second runtime library 330 in order to provide the first role of the second version of the distributed computerized service. Recall from the description of FIG. 2, and as also noted in FIG. 3, that the service processing node 211 may have a set of executable 231 that interact (as represented by the dotted line 241) with the first runtime library 230 in order to provide the same first role of the first version of the distributed computerized service.

The executable(s) 231 for the first role of the first service version may, however, be different than the executable(s) 331 for the first role of the second service version. The similarity of the roles is represented by the executable(s) 231 and 331 being represented by the same shape. The difference in the executable(s) 231 and 331 (to account for the need to interact with different runtime libraries, and provide somewhat different functionality within the same role) is represented by the executable(s) 331 being filled with dots, whereas the executable(s) 231 are represented as not being filled.

Also, in the service environment 300, the service processing node 212 serves the same role for each of the two versions of the distributed computerized service. For instance, the service processing node 212 may have a set of executable(s) 332 that interact (as represented by the dotted line 342) with the second runtime library 330 in order to provide the second role of the second version of the distributed computerized service. Service processing node 212 is also illustrated in FIG. 3 as having a set of executable(s) 232 that interact (as represented by the dotted line 242) with the first runtime library 230 in order to provide the same second role of the first version of the distributed computerized service.

Also, in the service environment 300, the service processing node 213 serves the same role for each of the two versions of the distributed computerized service. For instance, the service processing node 213 may have a set of executable(s) 333 that interact (as represented by the dotted line 343) with the second runtime library 330 in order to provide the third role of the second version of the distributed computerized service. Service processing node 213 is also illustrated in FIG. 3 as having a set of executable(s) 233 that interact (as represented by the dotted line 243) with the first runtime library 230 in order to provide the same third role of the first version of the distributed computerized service.

Thus, for instance, the service processing node 211 may provide a compilation role for multiple versions of the distributed computerized service (each version having a different runtime library). Likewise, the service processing node 212 may provide a scheduling role for multiple versions of the distributed computerized service. Furthermore, the service processing nodes 213 may provide a worker role for multiple versions of the distributed computerized service.

The centralized store 320 also includes a first role executable set collection 361 that includes the executable(s) 231 that interact (as represented by dotted line 241 in FIGS. 2 and 3) with the first runtime library 230 to allow a service processing node to perform a first role for a first version of the distributed computerized service, the executable(s) 331 that interact (as represented by dotted line 341 in FIG. 3) with the second runtime library 330 to allow a service processing node to perform a first role for a second version of the distributed computerized service, and executable(s) 431 that interacts with the third runtime library 430 to allow a service processing node to perform a first role for a third version of the distributed computerized service. The same shape of the executable(s) sets 231, 331, and 431 again emphasis that they are to allow a service processing node to providing the same role, albeit with different versions of the distributed computerized service.

The different fill (no fill for executable(s) 231, dotted fill for executable(s) 331, and small circle fill for executable(s) 431) represent differences in functionality that enable the executable(s) to interact with the respective runtime for the corresponding service version, and to account for other potential functional differences that still fall within the scope of the same role. The ellipses 531 represent that there may be other executable(s) sets, each for providing the first role with respect to other versions of the distributed computerized service.

The centralized store 320 also includes a second role executable set collection 362 that includes the executable(s) 232 that interact (as represented by dotted line 242 in FIGS. 2 and 3) with the first runtime library 230 to allow a service processing node to perform a second role for a first version of the distributed computerized service, the executable(s) 332 that interact (as represented by dotted line 342 in FIG. 3) with the second runtime library 330 to allow a service processing node to perform a second role for a second version of the distributed computerized service, and executable(s) 432 that interacts with the third runtime library 430 to allow a service processing node to perform a second role for a third version of the distributed computerized service. Similarity of shape, and differences of fill, have the same symbolic representation with respect to the executable set collection 362 for the second role as described above for the executable set collection 361 for the first role. The ellipses 532 represent that there may be other executable(s) sets, each for providing the second role with respect to other versions of the distributed computerized service.

The centralized store 320 also includes a third role executable set collection 363 that includes executable(s) 233 that interact with the first runtime library 230 to allow a service processing node to perform a third role for a first version of the distributed computerized service, executable(s) 333 that interact with the second runtime library 330 to allow a service processing node to perform a third role for a second version of the distributed computerized service, and executable(s) 433 that interacts with the third runtime library 430 to allow a service processing node to perform a third role for a third version of the distributed computerized service. Similarity of shape, and differences of fill, have the same symbolic representation with respect to the executable set collection 363 for the second role as described above for the executable set collection 361 for the first role. The ellipses 533 represent that there may be other executable(s) sets, each for providing the third role with respect to other versions of the distributed computerized service.

The ellipses 364 represent that there may be other executable set collections, each including executable(s) sets for a particular role for each of the versions of the distributed computerized service. In some embodiments, the executable(s) of each of the executable set collections 361, 362, 363 and 364 within the centralized store 330 may already in allocated form, such that the binary of the executable(s) need only be loaded into the system memory of a service processing node in order for the service processing node to be ready to play a role the distributed computerized service upon interacting with the appropriate runtime.

The service environment 300 is illustrated as having a limited number of service processing nodes. However, the principles described herein contemplate any number of available service processing nodes from as few as several, to as many as potentially millions or billions, such as in a typical public cloud computing environment. The service environment 300 further shows that each service processing node 210 may play a role in multiple versions of the distributed computerized service. However, the number of types of runtime libraries (each associated with a different version) that are run by any give service processing node may be anywhere from zero to many, and may fluctuate over time with demand for different versions of the distributed computerized service.

Furthermore, although the service environment 300 shows each service processing node involved in version(s) of the distributed computerized service playing a same role, the principles described herein also operate in which a service processing node plays different roles with respect to different versions of the distributed computerized service. As an example, a service processing node may be a compiler for a first version of a distributed computerized service, a scheduler for a second version of the distributed computerized service, and a worker for a third version of the distributed computerized service.

Figure 4:
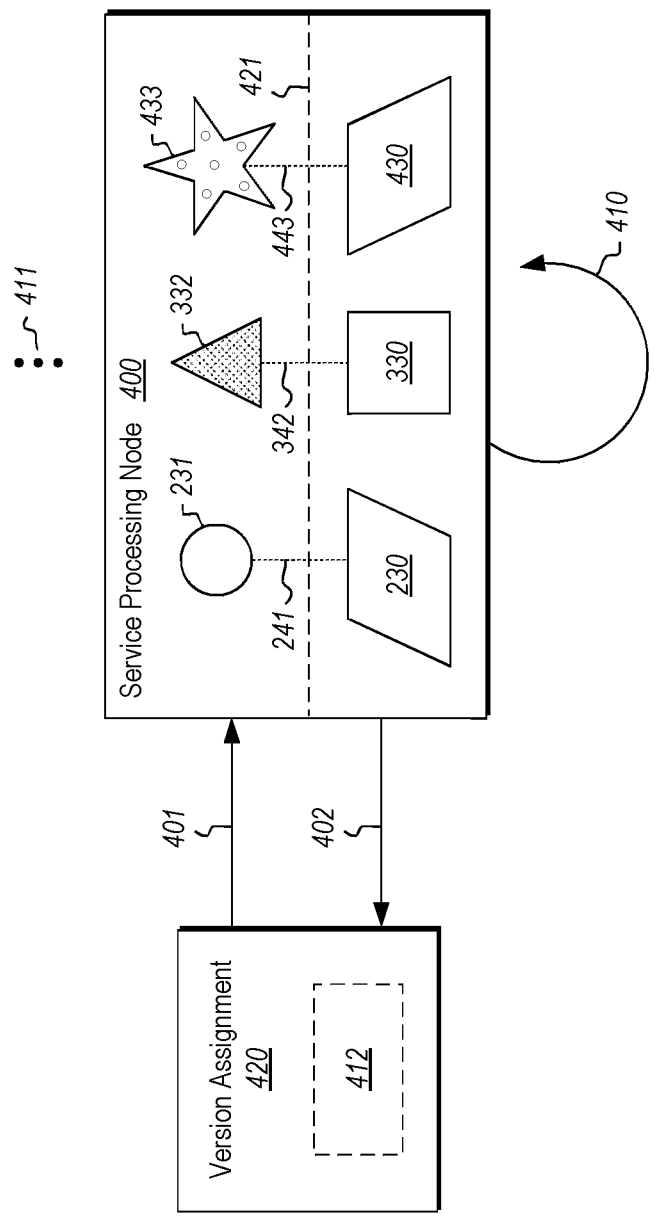
FIG. 4 is an example service processing node that interacts with a version assignment component, and with a durable local or centralized store, in order to perform proper roles in proper versions of a distributed computerized service, where the role plays by the service processing node for each of the service versions need not be the same.

For instance, FIG. 4 illustrates a service processing node 400 that includes three runtime libraries 230, 330 and 430. Executable(s) 231 interact (as represented by dotted line 241) with the first runtime library 230 (represented by a right leaning parallelogram) to provide a first role for a first version of the distributed computerized service. Executable(s) 332 interact (as represented by dotted line 342) with the second runtime library 330 (as represented by a rectangle) to provide a second role for a second version of the distributed computerized service. Executable(s) 433 interact (as represented by dotted line 443) with the third runtime library 430 (as represented by a left leaning parallelogram) to provide a third role for a third version of the distributed computerized service.

In FIG. 4, the service processing node 400 may load (as represented by arrow 410) an already allocated form of an appropriate runtime library for a version of the distributed computerized service either from a local durable store or from a centralized store (such as the centralized store 230 of FIG. 2 or the centralized store 330 of FIG. 3). For instance, this might be performed in response to an instruction (as represented by arrow 401) to process a job request of a version of the distributed computerized service for which the service processing node 400 does not yet have an associated runtime library up and running. The runtime library may be implemented and encapsulated as one binary package. Once a version of engine package is finalized to deploy, it is upload to a centralized store (e.g., a cloud store) which can be accessed by other service processing nodes and components (e.g., within a cluster). By having a versioned package, compatibility between different components in one version in guaranteed.

The service processing node 400 may also load (as represented by arrow 410) an already allocated form of appropriate already allocated executable(s) that allow the service processing node to perform a new role with respect to a version of the distributed computing system for which the service processing node already has or is also loading. Such loading might also be performed in response to an instruction 401 to for the service processing node to perform that role. The service processing node may also respond (as represented by the arrow 402) to that request.

In one embodiment, the loading operation (represented by arrow 410) may be implemented by a service host that is a service deployed to all service processing nodes within a defined boundary (e.g., within a cluster). It is designed to loads and unloads versions of the distributed computerized service based on the commands from the version assignment component, and also monitors the status of services in the service processing node.

A version assignment component 420 may perform the request 401, and register the responses 402 for each of multiple service processing components (as represented by the ellipses 411). A registry 412 may include an identifying of each service processing node, an indication of which service processing node is capable of running which service versions, and for each service version, what role the service processing node can plan. In some embodiments, the registry 412, or portions thereof, may be remotely located from the version assignment component 420. For instance, the registry 420 might include representations of numerous service processing nodes that are capable of compiling job requests for each of multiple versions of a distributed computerized service.

In FIGS. 3 and 4, service processing nodes are illustrated as running multiple runtime libraries using a single set of hardware resources (e.g., a single service processing node). This may be accomplished by at least interleavingly running multiple runtime libraries. In this description and in the claims, "at least interleavingly running" multiple runtime libraries means that the runtime libraries are either interleavingly run or concurrently run. In the case of concurrency, the service processing node may be capable of running concurrent threads at least one for each runtime library.

In this description and in the claims, "interleavingly" running of multiple runtime libraries means that no more than one of the first runtime library and the second runtime library is available in a system memory of the service processing node at a time. When a runtime library is not available in the system memory for a given service version, that runtime library is obtained (e.g., in already allocated form) from local durable storage, or from a centralized store. When an executable(s) to play a certain role is not available in the system memory for a given role, and the service processing node is about to commence that role, the appropriate executable(s) are obtained (e.g., in already allocated form) from local durable storage, or from a centralized store. In the context of long-running services, this change in context during interleaving is often fast enough that the service processing node may still be seen as simultaneously running two runtimes, especially when the switching is hastened by the runtime library and/or executable(s) already being in the appropriate binary form, and ready to execute.

Accordingly, the principles described herein allow a service version to flexibly operate multiple versions of a distributed computing service simultaneously. This allows for considerable opportunity to employ multiple service versions using a common set of available service processing nodes. For instance, older and newer service versions may exist concurrently. This allows for job requests to continue processing as they always have, using an older version (thereby providing legacy support), while also accommodating new adopters (for those willing to try newer versions), and all job requests in-between. Furthermore, new versions can be tested with a small amount of traffic to verify proper operation before more wide scale usage of that version.

Figure 5:
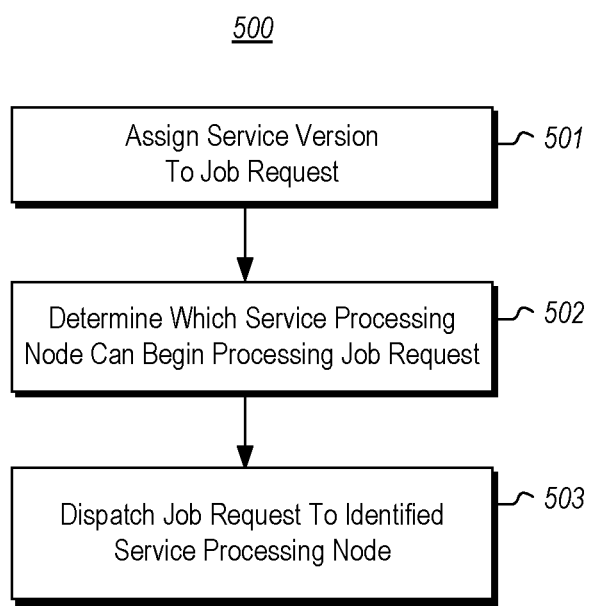
FIG. 5 illustrates a flowchart of a method for channeling job requests to a service processing node appropriate for the version of the job request in accordance with the principles described herein.

FIG. 5 illustrates a flowchart of a method 500 for channeling job requests to a service processing node appropriate for the version of the job request. The method 500 may be performed for each of multiple incoming job requests to be processed by the distributed computerized service. The method 500 may be performed by, for instance, the version assignment component 420 of FIG. 4. In short, the method 500 includes assignment of a service version to the job request (act 501), identifying an appropriate service processing node to begin processing the job request of that version (act 502) and then causing the job request to be dispatched to that service processing node (act 503). Each of these acts will now be described in much further detail.

The assignment of the service version to the job request (act 501) may occur in any number of ways. As an example only, the service version may be assigned based at least in part on an evaluation of the structure of the job request itself. For instance, the job request might actually express the service version to be assigned to the job request. The job request might also express other information from which the service version may be derived. For instance, the job request might identify a requestor identity, resource availability to the requestor, a time of generation of the request, and so forth. Such parameters may be used (e.g., in accordance with some version assignment policy) to determine the service version to be assigned to the job request.

As already mentioned, the service version may alternatively, or in addition, be assigned based on a version assignment policy. For instance, the version assignment policy might specify that certain users or user groups are to have their job requests assigned a certain service version, that users having access to particular resources are to have their job requests assigned to a certain service version, that a certain volume of job requests are to be assigned to a certain service version, and so forth.

The identification of which of the service processing nodes runs a runtime library for the assigned service version and runs a particular set of one or more executables that interact with the runtime library (act 502) may be performed by the version assignment component 420 by use of the registry 412. For instance, the particular set of one or more executables might simply be those executables (e.g., a compiler) that the job request should first be processed by. After all, a job request cannot be processed further until it is compiled to be understood by other service processing nodes. The registry 412 will also tell the version assignment component 420 which of the service processing nodes plays that important initial role in processing the job request of the assigned service version (act 502). The case of there being no acceptable service processing nodes that play that initial role with respect to the assigned version will be deferred slightly until the description of FIG. 6 below.

Finally, the job request is dispatched to the identified service processing node that performs the initial role for the assigned version of the distributed computerized service (act 503). For instance, this dispatching is represented by arrow 401 in FIG. 4, if the service processing node 400 was the selected service processing node, but a similar dispatch instruction may be performed with respect to any of potentially numerous service processing nodes as represented by the ellipses 411 in FIG. 4.

Figure 6:
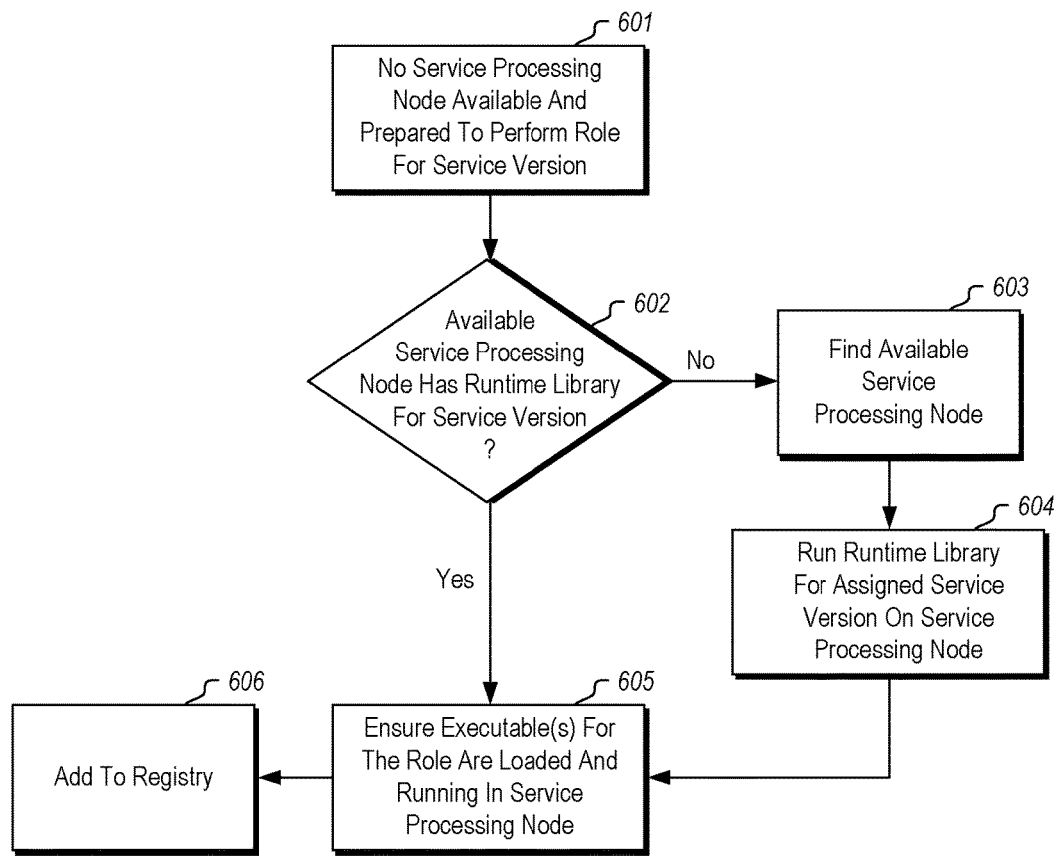
FIG. 6 illustrates a flowchart of a method 600 for preparing a service processing node to receive a job request of a particular service version.

In may be, then when attempting to select an appropriate service processing node (act 502) that performs the initial role for the assigned version of the distributed computerized service, that there is no such service processing node presently available. For instance, service processing nodes that could perform the initial role for that service version might already be occupied, or dispatch to an available service processing node might threaten a software license agreement (SLA) with respect to one or more customers of the service environment. If that is the case, the version assignment component performs a method for preparing a service processing node. FIG. 6 illustrates a flowchart of a method 600 for preparing a service processing node to receive a job request of a particular service version.

The method 600 is initiated upon first determining that there are no available service processing nodes that are presently prepared to play the particular role for the assigned service version (act 601). It is then determined whether there are any available service processing nodes that have the appropriate runtime library for the particular service version (decision block 602). If not ("No" in decision block 602), then the version assignment component finds an available service processing node (act 603), and causes the runtime library for the assigned service version to be run on the available service version (act 604). For instance, the version assignment component 420 might cause an instruction (such as represented by arrow 401) to be issued to the service processing node to load the runtime library from the centralized store.

If there is already an available service processing node that is running the runtime library for the assigned service version ("Yes" in decision block 602), or after an available service processing node is found (act 603) and caused to run such a runtime library (act 604), it is then ensured that the appropriate executable(s) for playing the particular role with respect to this service version are loaded and run on the identified service processing node (act 605). For instance, if not already running, the version assignment module 420 may instruct (e.g., via arrow 401) the service processing node to load the appropriate executable(s) from the centralized store, and run the same. The service processing node is then registered (e.g., in registry 411) as corresponding to the assigned service version and the assigned role (act 606).

Thus, the version assignment component 420 may be a central service to serve the following functions: 1. monitor all the versions deployed amongst the multiple service processing nodes (e.g., a cluster); 2. control the versions loaded in each service processing node; 3. once a job request is received, determines which version of engine should be used to execute the request based on the query attributes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
hardware storage media having stored thereon computer-executable instructions which, when executed by the one or more processors, cause the computing system to perform at least the following:
assign a service version to a job request, wherein the service version is a version of a distributed computerized service for processing the job request and that is selected from amongst a plurality of service versions of a distributed computerized service that are available on a plurality of service processing nodes;
based on the assigned service version, identify a subset of the plurality of service processing nodes which are each able to run a version of a common runtime library for the assigned service version, and what role or roles each of the subset of the plurality of service processing nodes can perform based on the version of the common runtime library; and
distribute tasks of the job request to one or more of the identified subset of the plurality of service processing nodes which have been configured to run the version of the common runtime library, wherein each service processing node to which a task is distributed then runs a particular set of executables for a given role to be performed by the service processing node to which the task is distributed, wherein the particular set of executables corresponds to the version of the common runtime library in use at the service processing node to which the task is distributed, and wherein the particular set of executables performs one or more of compiling the job request into an execution plan compatible for execution by the assigned version of the distributed computerized service, scheduling the distributed tasks of the execution plan for processing by one or more of the identified service processing nodes, or executing the scheduled tasks in accordance with the execution plan.

2. A computerized method for processing received job requests in a manner that allows for job requests to be appropriately distributed to nodes having a common runtime library having a proper version of a distributed computerized service, the method comprising:
assigning a service version to a job request, wherein the service version is a version of a distributed computerized service for processing the job request and that is selected from amongst a plurality of service versions of the distributed computerized service that are available on a plurality of service processing nodes;
based on the assigned service version, identifying a subset of the plurality of service processing nodes which are each able to run a version of the common runtime library for the assigned service version, and what role or roles each of the subset of the plurality of service processing nodes can perform based on the version of the common runtime library; and
distributing tasks of the job request to one or more of the identified subset of the plurality of service processing nodes which have been configured to run the version of the common runtime library, wherein each service processing node to which a task is distributed then runs a particular set of executables for a given role to be performed by the service processing node to which the task is distributed, wherein the particular set of executables corresponds to the version of the common runtime library in use at the service processing node to which the task is distributed, and wherein the particular set of executables performs one or more of compiling the job request into an execution plan compatible for execution by the assigned version of the distributed computerized service, scheduling the distributed tasks of the execution plan for processing by one or more of the identified service processing nodes, or executing the scheduled tasks in accordance with the execution plan.

3. The computerized method in accordance with claim 2, wherein one or more of the identified service processing nodes run runtime libraries for each of multiple versions of the distributed computerized service.

4. The computerized method in accordance with claim 2, further comprising:
registering the identified plurality of service processing nodes such that the registration may be referred to in determining that a particular service processing node runs the runtime library for the corresponding service version when future job requests are received that are to be assigned the same service version.

5. The computerized method in accordance with claim 2, wherein the selected service version is selected based evaluating a structure of the job request.

6. The computerized method in accordance with claim 5, wherein evaluating the structure of the job request comprises reading the service version to be assigned to the job request from the job request itself.

7. The computerized method in accordance with claim 2, wherein the selected service version is selected based on evaluating a version assignment policy.

8. The computerized method in accordance with claim 7, wherein the version assignment policy specifies service versions by volume of received job request to be processed by each service version from amongst the plurality of service versions of the distributed computerized service.

9. The computerized method in accordance with claim 7, wherein the version assignment policy specifies which service version is to process job requests from a particular user or user group, and wherein selection of the assigned service version comprises:
   identifying a user or user group associated with the job request; and
   determining that a particular service version that is to be selected is the service version specified in the policy as corresponding to the particular user or user group.

10. The computerized method in accordance with claim 2, wherein the distributed computerized service comprises a cloud computing environment such that the plurality of service processing nodes are within the cloud computing environment.

11. The computerized method in accordance with claim 2, wherein the one or more identified service processing nodes to which a task is distributed comprises at least a first set of one or more executables running on a first service processing node that runs the common runtime library associated with the service version, and a second set of one or more executables running on a second service processing node that runs the common runtime library associated with the service version.

12. The computerized method in accordance with claim 11, wherein the first set of one or more executables comprises a compiler set of executables for compiling the job request into an execution plan, and the second set of one or more executables comprises a worker set of executables that runs at least a portion of the execution plan.

13. The computerized method in accordance with claim 12, wherein the execution plan is a map-reduce execution plan.

14. A computer program product comprising one or more physical and tangible hardware storage devices having stored thereon computer-executable instructions that are structured such that, when executed by one or more processors of a computing system, the computer- executable instructions cause the computing system to process received job requests in a manner that allows for job requests to be appropriately distributed to nodes having a runtime library having a proper version of a distributed computerized service, the computer-executable instructions including instructions that cause the computing system to:
   assign a service version to a job request, the service version being a version of a distributed computerized service for processing the job request and that is selected from amongst a plurality of service versions of the distributed computerized service that are available on a plurality of service processing nodes, and wherein the selection of the service version is based on inspection of a structure of the job request, an identity of a requestor, or a version assignment policy;
   based on the assigned service version, identify, from a registry, a subset of the plurality of service processing nodes which are each able to run a version of a common runtime library for the assigned service version, and what role or roles each of the subset of the plurality of service processing nodes can perform based on the version of the common runtime library; and
   distribute tasks of the job request to one or more of the identified subset of the plurality of service processing nodes which have been configured to run the version of the common runtime library, and wherein each service processing node to which a task is distributed then runs a particular set of executables for a given role to be performed by the service processing node to which the task is distributed, wherein the particular set of executables corresponds to the version of the common runtime library in use at the service processing node to which the task is distributed, and wherein the particular set of executables performs one or more of compiling the job request into an execution plan compatible for execution by the assigned version of the distributed computerized service, scheduling the distributed tasks of the execution plan for processing by one or more of the identified service processing nodes, or executing the scheduled tasks in accordance with the execution plan.

15. The computing system in accordance with claim 1, wherein the computer-executable instructions further cause the computing system to register the identified plurality of service processing nodes such that the registration may be referred to in determining that a particular service processing node runs the runtime library for the corresponding service version when future job requests are received that are to be assigned the same service version.

16. The computing system in accordance with claim 1, wherein the selected service version is selected based evaluating a structure of the job request.

17. The computing system in accordance with claim 16, wherein evaluating the structure of the job request comprises reading the service version to be assigned to the job request from the job request itself.

18. The computing system in accordance with claim 1, wherein the selected service version is selected based on evaluating a version assignment policy.

19. The computing system in accordance with claim 18, wherein the version assignment policy specifies service versions by volume of received job request to be processed by each service version from amongst the plurality of service versions of the distributed computerized service.

20. The computing system in accordance with claim 18, wherein the version assignment policy specifies which service version is to process job requests from a particular user or user group, and wherein selection of the assigned service version comprises:
   identifying a user or user group associated with the job request; and
   determining that a particular service version that is to be selected is the service version specified in the policy as corresponding to the particular user or user group.

* * * * *